US010251128B2

(12) United States Patent
Nguyen

(10) Patent No.: US 10,251,128 B2
(45) Date of Patent: Apr. 2, 2019

(54) PROXIMITY AND LOW POWER USAGE BASED AD HOC WIRELESS INTER-DEVICE COMMUNICATION SYSTEM AND METHOD

(71) Applicant: Antoine Nguyen, San Francisco, CA (US)

(72) Inventor: Antoine Nguyen, San Francisco, CA (US)

(*) Notice: Subject to any disclaimer, the term of this patent is extended or adjusted under 35 U.S.C. 154(b) by 361 days.

(21) Appl. No.: 15/261,833

(22) Filed: Sep. 9, 2016

(65) Prior Publication Data

US 2018/0077648 A1    Mar. 15, 2018

(51) Int. Cl.
| | | |
|---|---|---|
| *H04W 52/02* | (2009.01) | |
| *H04W 4/00* | (2018.01) | |
| *H04W 4/14* | (2009.01) | |
| *H04W 4/06* | (2009.01) | |
| *H04W 4/021* | (2018.01) | |
| *H04L 12/58* | (2006.01) | |
| *H04W 4/80* | (2018.01) | |
| *H04W 4/90* | (2018.01) | |
| *H04W 84/18* | (2009.01) | |

(52) U.S. Cl.
CPC ......... *H04W 52/0229* (2013.01); *H04L 51/04* (2013.01); *H04L 51/18* (2013.01); *H04L 51/20* (2013.01); *H04W 4/021* (2013.01); *H04W 4/06* (2013.01); *H04W 4/14* (2013.01); *H04W 4/80* (2018.02); *H04W 4/90* (2018.02); *H04W 52/0254* (2013.01); *H04W 84/18* (2013.01); *Y02D 70/00* (2018.01); *Y02D 70/10* (2018.01); *Y02D 70/142* (2018.01); *Y02D 70/144* (2018.01); *Y02D 70/164* (2018.01); *Y02D 70/20* (2018.01); *Y02D 70/26* (2018.01)

(58) Field of Classification Search
None
See application file for complete search history.

(56) References Cited

U.S. PATENT DOCUMENTS

| | | | | |
|---|---|---|---|---|
| 7,386,517 B1* | 6/2008 | Donner | ......... | G06Q 10/02 705/14.14 |
| 9,094,407 B1* | 7/2015 | Matthieu | ......... | H04W 4/70 |
| 9,299,053 B2* | 3/2016 | Gazdzinski | ......... | G06Q 10/08 |
| 2003/0060211 A1* | 3/2003 | Chern | ......... | H04M 1/6075 455/456.2 |
| 2009/0305729 A1* | 12/2009 | Bennett | ......... | G06F 17/289 455/466 |

(Continued)

*Primary Examiner* — Kenny S Lin

(57) ABSTRACT

A system of mobile devices, smartwatches, wearable devices, beacon devices and implemented method that make use of embedded network connection module capable of short distance connection range and low power consumption, and invented concepts of virtual service channel, virtual band, virtual user group and virtual poster, to create proximity based ad hoc inter-device communication systems such as building real-time inter-resident communication system, media information display-broadcasting system, remote emergency help request activation system, indoor short message communication system, mobile poster slide-show display stand system, object monitoring system, virtual device searching system, virtual coupon based marketing system, virtual media source exchange system, object activity alert system and waiting list registration system.

11 Claims, 6 Drawing Sheets

(56) References Cited

U.S. PATENT DOCUMENTS

| | | | |
|---|---|---|---|
| 2012/0210345 A1* | 8/2012 | Wong | H04N 21/254 |
| | | | 725/25 |
| 2013/0094538 A1* | 4/2013 | Wang | H04B 1/707 |
| | | | 375/141 |
| 2013/0217333 A1* | 8/2013 | Sprigg | G06Q 30/0207 |
| | | | 455/41.2 |
| 2014/0274115 A1* | 9/2014 | Michalson | H04W 4/029 |
| | | | 455/456.1 |
| 2016/0127863 A1* | 5/2016 | Yoon | H04M 3/42348 |
| | | | 455/456.3 |
| 2016/0300185 A1* | 10/2016 | Zamer | G06Q 10/0834 |
| 2017/0161716 A1* | 6/2017 | Hurley | G06Q 20/3224 |
| 2017/0166417 A1* | 6/2017 | Salmikuukka | B66B 1/468 |
| 2017/0245105 A1* | 8/2017 | Connelly | H04W 4/021 |
| 2018/0165945 A1* | 6/2018 | McClendon | G08B 25/14 |

\* cited by examiner

| 91 | ~home | BCE9E1E4-0C6D-4EC2-A36A-3D6933869BC0 | ~90 |
| 91 | ~mailbox | A5038020-7F9E-4331-8286-EABEE5088A23 | ~90 |
| 91 | ~residence | 3E73333F-1BA3-4812-8189-FD52D11F9644 | ~90 |

FIG.1

| 92 | ~1 (band #) | BCE9E1E4-0C6D-4EC2-A36A-3D6933869BC0 | ~90 |
| 92 | ~2 (band #) | A5038020-7F9E-4331-8286-EABEE5088A23 | ~90 |
| 92 | ~3 (band #) | 3E73333F-1BA3-4812-8189-FD52D11F9644 | ~90 |

FIG.2

| 91 | ~home | 1 (band #) | ~92 |
| 91 | ~mailbox | 2 (band #) | ~92 |
| 91 | ~residence | 3 (band #) | ~92 |

FIG.3

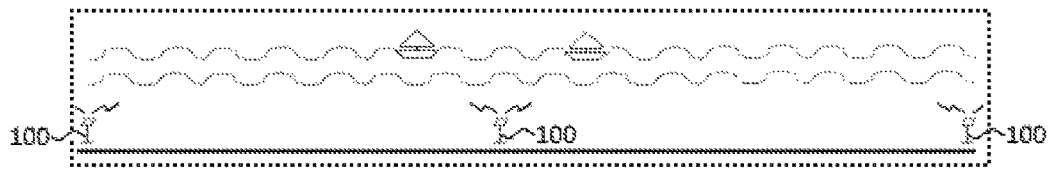
FIG. 4
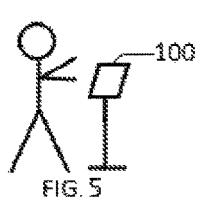
FIG. 5
FIG. 6
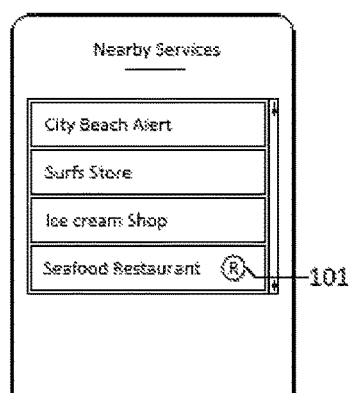
FIG. 7
FIG. 8
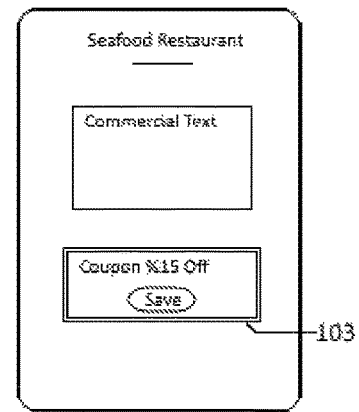
FIG. 9

PROXIMITY AND LOW POWER USAGE BASED AD HOC WIRELESS INTER-DEVICE COMMUNICATION SYSTEM AND METHOD

BACKGROUND OF THE INVENTION

When a visitor arrives at a large gathering like a street fair, a local celebration or a facility, and at a moment in time may want to get more information about the purpose of the gathering, the extent of the gathering, the available activities at the gathering, the help contact to reach in case of necessity or emergency; in this situation, the visitor can have multiple options:

Find the organizer's office if it exists.

Find a public information panel stand or ask people around.

When only a phone number, a hyperlink or an email address of the gathering or facility administrator is provided, the said visitor can use his mobile device (smartphone, tablet or any equivalent devices) to obtain the needed information via device's browser, phone application or email application. As the internet connection is engaged for the purpose, the visitor's mobile device must have a WiFi or broadband connection capability which is not always possible for every visitor, since the broadband connection usage may require a prepaid subscription, hence the potential cost dependency of these solutions. Also these means of communication may cause an excessive delay since the expected responses can be sometimes unpredictable or unavailable.

On the other hand, the gathering or facility administrator may at a moment in time wants to inform all visitors or a group of visitors at a specific location about a commercial offer, an emergency situation; in pursuance of the said task, the administrator can have multiple options:

Update the urgent information on the website dedicated to the gathering or the facility, but the information is unlikely to reach visitors in real time.

Use speaker or distribute leaflets throughout the facility or the gathering area to inform the visitors.

To reduce greatly the information access time in this scenario, there are proposed solutions from the internet-of-things technological field (named IOT thereafter). The most commonly proposed solutions use system-on-a-chip or microchip based beacon devices (also known as beacon tags) to broadcast over the air using a short distance based wireless network connection, a preprogrammed message that contains information related to services available at the location where the beacon is set up. To read the message, the visitor in this scenario, needs to use a dedicated mobile application installed on his mobile device to capture the message, process it and present the related information via a user interface on the screen of his device. As the visitor moves around the facility, he can get informed in real time whenever he enters the broadcasting area of other beacon devices that have been set up along the way; also the visitor just needs to make some finger touches to open the information of interest, instead of typing in a long hyperlink, a phone number, an email address, like it is described in the visitor's first scenario.

The information broadcast by each IOT beacon device is either preprogrammed or originated from the microchip itself, but cannot be a relayed information from a third party device due to the inherent limitation of the beacon devices' microchip system; as a result, the administrator of the gathering or facility cannot use these beacon devices to broadcast real time information when needed, and has to resort to the manual way instead.

Moreover the IOT beacon devices which are set up throughout the gathering or facility can belong to different service providers, therefore can work only with their owners' mobile applications; consequently each visitor will need to install as many mobile applications as information he needs to view, hence the potential complexity of the current standalone IOT solutions.

In conclusion, most of the currently proposed standalone IOT solutions have simplified people's lives indeed, but one can point out that there are still some potential problems that remain to be solved: inadequacy, complexity, cost dependency, excessive delay for getting information in real time in an ad hoc environment, that are caused by the use of hyperlink, phone call, email and location oriented microchip based beacon devices.

SUMMARY OF THE INVENTION

The aforementioned potential problems of inadequacy, complexity, cost dependency, excessive delay for a visitor to get information in real time in an ad hoc environment using hyperlink, phone call, email, standalone beacon devices can be solved by the system and associated method of the present invention.

The present invention relates to a system of mobile devices (e.g. smartphones, phablets, tablets), smartwatches, wearable devices, beacon devices, and a method implemented on each device via a chip based program code (mobile application or firmware) stored in device's non-transitory readable medium; that allow, within the limit of a short distant based network coverage and in real time, these devices to send and receive messages to and from each others, send or perform task requests to and from each others, provide service information to others; and all these actions to be done through ad hoc virtual service channels and associated virtual user groups. The system and method of the present invention make use of:

A network connection standard based system module capable of short distance connection range (e.g. about 100 meters) and low power consumption, to send and receive short messages between devices, so that the devices of the system can generate themselves an autonomous network over the air for the inter-device communication purpose while keeping the power consumption on the devices as little as possible.

Concepts of virtual service channels, virtual service bands and virtual user groups that allow organizers and visitors of gatherings or facilities to create ad hoc user groups of real-time inter-device communication by means of virtual channels that are based on service purposes, and virtual bands that are based on network connection broadcasting constraint; and through these concepts the organizers can provide location oriented services and information to visitors, users, residents; and also alert them about emergency situation and events; and consequently the visitors, users, residents can get informed about location oriented services and information, get alerted about emergency situation and events, send and receive messages between them or to organizers, send and perform task requests to and from each others.

Concept of virtual posters to allow organizers to display and broadcast location oriented information automatically when the visitors, users, residents enter the facility or in front of an object of interest, then allow the latter to respond to the displayed information therein if needed.

Concept of sending or performing task request on demand such as: text message display, voice or sound alarm activation, automated phone call activation, sensor status report, GPS location report, inter-device relative position report, activation of device embedded program, picture taking, video taking, audio recording if equipped with relevant hardware components.

Concept of mutual monitoring of devices' presence, unexpected movement, unexpected sound or noise.

Concept of ad hoc message relaying devices to expand network coverage of source device when needed.

Concept of anchor devices to edit and broadcast virtual posters, to trigger mass broadcasting of message via message relaying devices, to send or receive an external system based messages via WiFi or broadband connections.

Concept of virtual coupons via virtual service channels and virtual posters as a means to allow location based service providers to incite visitors to come to their business premises (shops, stands, offices). For a service provider that creates a virtual service channel to broadcast virtual posters of actionable virtual coupons, the method of the system will display these posters on the screen of the visitors' device when the visitors enter the network coverage of an anchor device that broadcasts these virtual posters; the visitors can then select and save these virtual coupons on their device to redeem them later.

Some exemplary ad hoc proximity based inter-device communication systems using the system and method of the present invention can be: building real-time inter-resident communication system, media information display-broadcasting system, remote emergency help request activation system, indoor short message communication system, mobile poster slideshow display stand system, object monitoring system, virtual device searching system, virtual coupon based marketing system, virtual media source exchange system, object activity alert system and waiting list registration system.

DETAILED DESCRIPTION OF THE INVENTION

A system of mobile devices, smartwatches, wearable devices and beacon devices, connected to each other in close proximity for multi-purpose targeted inter-device communications using a method implemented computer chip or microchip program code stored in each device's non-transitory readable medium; the said system and method comprise:

Making use of an external standard network connection module embedded in each device of the system, that provides short distance coverage range and low power consumption (e.g. Bluetooth low energy wireless network protocol) to send and receive short messages between devices of the system within the accessible range defined by the used network connection protocol. The said network connection module can be an integral part of the operating system of the implemented devices or is an imported system module onto the implemented mobile device.

A plurality of mobile devices, wearable devices and beacon devices that must provide each at least a basic functionality of the system which consists of sending and receiving short messages using the device's said network connection module.

The short messages conveyed by the system for inter-device communications can be a text string that contains a simple message or a task request from one device to another. A task request can be an operation request sent from a device of the system that cannot do the operation itself, and the task request receiving device must honor this request automatically. An exemplary embodiment of task request is an emergency call request or a help call request that the originating user of this request cannot perform due to his physical impairment except performing a button press (illustrated by FIG. 18 and FIG. 19); the request receiving device will automatically make the phone call based on the user's previous setup of destination phone number that is stored in the said device's non transitory medium. Another exemplary embodiment of task request is a message to display, an alarm sound to activate, a voice message to play on the task request receiving device.

A concept of virtual service channel which is a channel that carries messages sent and received between devices which share a specific targeted service purpose of inter-device communication.

Each said targeted service purpose of inter-device communication is defined by the administrator of the system; the administrator can decide what kind of purpose the inter-device communication is used for, provide that each member of an inter-device communication can communicate with other peers via one device that implements the method: e.g. communication between family members at home (illustrated by FIG. 14, FIG. 15, FIG. 16 and FIG. 17), communication between residents inside a building, communication between employees at a company facility (illustrated by FIG. 25), communication between team members at a scrum meeting room, communication between host and guests at a conference room, alert communication between law enforcement officials and people at a public gathering, monitoring presence of other devices, monitoring unauthorized access to other devices by motion detection sensor, etc.

Each virtual service channel is identified, on the network implementation side, by a service based universally unique identification string generated by the underpinning wireless network protocol (e.g. Bluetooth service UUID number), which is commonly known as "Service Universally unique identifier" (or Service "UUID" for short) (illustrated by references 90 in FIG. 1 and FIG. 2). The wireless network protocol will use this unique service identification string to broadcast the associated virtual service channel over the air.

Each virtual service channel is identified, on the user implementation side, by a channel unique identifier which must be a short name or text string composed of characters and/or numbers so that the latter can be verbally transmitted between people for quick setup of inter-device communications; channel unique identifiers are illustrated by references 91 in FIG. 1 and FIG. 3.

The one-to-one association between one unique channel identifier and one unique network generated UUID, is intended to help the user to bypass any complicated handling of the network generated UUID due to the latter's inherently long character string. An exemplary embodiment of a virtual service channel dedicated to inter-device communication between family members at home can be defined as an association of virtual service channel identifier "home" with a network generated service UUID "BCE9E1E4-0C6D-4EC2-A36A-3D69331369BC0" (illustrated by FIG. 1).

A concept of list of universal virtual service channels for most used purposes, so that the user can quickly set up an inter-device communication via a couple of selection clicks inside a drop-down menu that contains a list of universal virtual service channels.

A mobile device implemented method to allow the user to: create virtual service channels; discover and subscribe to ad hoc virtual service channels that are active around the user (within the network inherent coverage range limit); activate one or many virtual service channels on a same device; deactivate one, some or all virtual service channels on a same device; communicate from one device to other peer devices via one or many virtual service channels, and each message sent or received is bound to a specific virtual service channel.

A concept of virtual user group that is attached to a virtual service channel. A virtual user group defines a subset of users or a user that can become temporary or permanent members of a virtual service channel. As a result a virtual user group can be removed anytime without impacting its owning virtual service channel, and allows a message sending can be tailored to some but not all virtual user groups of a virtual service channel. A virtual user group is identified by a virtual user group code which can be set, added or removed by the user who creates its owning virtual service channel; a virtual service channel can have a plurality of attached virtual user groups which can be expanded or reduced in real time, and the method of the system uses these virtual user group codes to filter out messages that do not belong to their owning virtual service channel. A virtual group of users can share a common service purpose with all other virtual user groups of a virtual service channel, but still can have a second service purpose of its own which is not shared with all other virtual user groups. The virtual user group codes are defined by the users when they create their virtual service channels. The method will use the virtual user group codes to filter out messages that do not belong to their associated virtual user group. Embodiment of virtual user groups can be: employees in a company facility can have a shared virtual service channel with several associated virtual user groups: a main virtual user group "All employees" to include all employees of the company, and as many other virtual user groups as there are specific teams and departments inside the company such as "human resources", "accounting", etc. An exemplary embodiment of a virtual service channel identified as "company" with two virtual user group codes: "12345" for all employees of the company and "67890" for employees of the human resources department of the company.

A concept of virtual service band that uses a unique incremental order based identification number or character string to represent exclusively a unique wireless network protocol generated service identification string (e.g. Bluetooth service UUID number) (illustrated by references 92 in FIG. 2 and FIG. 3); and a concept of list of universal virtual service bands, so that a user can quickly reserve a virtual service band among the available ones of the list and associate it to a brand-new ad hoc virtual service channel that the user wants to create without having to search for a similar virtual service channel inside the method implemented list of universal virtual service channels: e.g. a large restaurant manager can reserve the virtual service band #5 to create a temporary virtual service channel dedicated to seat reservation customer calls for an impromptu celebration purpose, even though the restaurant already has a seat reservation dedicated virtual service channel for general customers. An exemplary embodiment of a virtual service band 1 is a network generated service UUID "BCE9E1E4-0C6D-4EC2-A36A-3D69331369BC0".

A mobile device implemented method to make a device of the system to become an object monitoring device that can detect disappearance, unexpected movement of objects of interest, or unexpected noise or sound in the proximity of objects of interest. A set of at least two devices can create an object monitoring system: The monitored device is a device of the system (preferably a beacon device) that can be attached to the object of interest so that the latter can be monitored conjointly; if the object of interest is a device of the system then the object of interest becomes the monitored device itself; the monitored device is controlled remotely by a dedicated monitoring device of the said system placed within the network coverage of the system via a predefined virtual service channel and virtual user group code; the monitoring is managed via these virtual service channel and virtual user group code through which the monitoring devices can send to monitored devices messages of monitoring start-and-stop requests, the monitored devices can send to monitoring devices messages reporting presence of movement or sound, and the monitoring devices can set timer to detect absence of responses from monitored devices, hence their disappearance. The monitoring device will inform the users of the system via a sound alarm activation or by broadcasting an alert message to other designated devices when it detects the absence of response from the monitored device attached to the object of interest or when it receives a motion change event, a sound presence event sent from the latter. An exemplary embodiment of this method is to turn a system of mobile devices into an object monitoring system for firearm, smartphones or vehicles that can alert the owners of these objects whenever the latter are being taken away or tampered with by unauthorized persons (illustrated by FIGS. 20, 21).

A mobile device implemented method to make a device of the system to become an object activity alert device that, when placed near or inside an object of interest, can alert the owner, guardian or user of this object of interest that an activity associated to the object has just been fulfilled or an associated sensor data monitoring event has occurred; the activity fulfillment alert can be actionable via a person using a predefined user interface of the said alert device of the system; the sensor data monitoring alert can be actionable automatically via an embedded program code of the said alert device of the system; the produced alert message is broadcast using a dedicated virtual service channel associated with a virtual user group. An exemplary embodiment of the system and method is a mailbox cluster monitoring device (illustrated by FIG. 10) that can be set up and placed above a building mailbox cluster unit so that a postal carrier can use the mailbox monitoring device, via some menu clicks on the device screen (illustrated by FIG. 11 and FIG. 12), to send alert messages to all relevant residents of the building about the mail or package arrival (illustrated by FIG. 13); if a mailbox is destined to a house only then the monitoring device of the system can be placed inside the mailbox, and the home residents can send a task request to the monitoring device of the system to take a picture of the inner of the mailbox, provided that the monitoring device is equipped with an embedded camera module; each resident who wants to receive and view the mail-package arrival alerts must be equipped with a device of the system which subscribes to and activates the same virtual service channel and associated virtual user group dedicated for the mail-package delivery purpose. Another exemplary embodiment of the system and method is a baby-in-car alert device that can be placed on or near a baby car seat so that any movement, temperature threshold reach can be detected and reported by the monitoring device; the report targeted devices can receive the alert message either via the system implemented network connection module, or via the monitoring device's external WiFi, broadband connection if equipped with such capability.

A mobile device implemented method to turn a mobile device of the system into an intercom-doorbell device that can be placed on a home front door or on a residence entrance wall (illustrated by FIG. 22). A guest can press on a dedicated virtual button on the screen of the said intercom-doorbell device to trigger a door bell alarm for the house or the associated apartment (illustrated by reference 202 in FIG. 23 and reference 214 in FIG. 24); as a result the said intercom-doorbell device will then send a doorbell associated message and/or a doorbell associated sound activation request to the mobile devices of the associated residents; any associated resident can then send back to the said intercom-doorbell device a response message to the guest, or a picture or video taking request before responding to the guest, or just keep silent. A guest can also press on a dedicated virtual button on the screen of the said intercom-doorbell device to edit and leave a message to the residents of the house or the associated apartment (illustrated by reference 203 in FIG. 23 and reference 215 in FIG. 24); the said intercom-doorbell device will then send the edited message of the guest to the mobile devices of the associated residents.

A concept of virtual poster which is an information that is limited in time by a period of validity, in space by a limited location coverage, and is associated to a virtual service channel based on its purpose, and can be broadcast over the air via the system implemented network connection module. The mobile device implemented method of the system can activate the said virtual poster when its publishing schedule time starts and deactivate it when its period of validity expires or its owned virtual service channel is deleted or deactivated. Once a virtual poster is activated on a mobile device, the mobile device implemented method will send the said virtual poster's content via short message to any other peer devices that enter or are already present in the system defined network coverage range where the virtual poster owned mobile device is located. An exemplary embodiment of the concept of virtual poster is a parking monitoring device of a company or residence building; the parking monitoring device broadcasts its active virtual posters which contain daily notices about activities at the company or residence building, or about temporary parking closing days; to car drivers who enter or drive by an entrance of the parking where the said parking monitoring device is set up, provided that the drivers are equipped with a mobile device of the system and the driver device's dedicated virtual service channel of the company or residence building that manages the parking is activated.

A mobile device implemented method to turn a basic device of the system into an anchor device which provides more functionalities than a basic device of the system can do. Only an anchor device of the system can allow users to edit and manage posters and make them displayed on the main screen of the device when placed in a public dedicated place for all to see. Only an anchor device can send and receive messages of its managed virtual service channels to and from other anchor devices beyond the network defined coverage range if equipped with internet communication capability; and for this purpose only an anchor device can be assigned with a unique email address. Only an anchor device can have preferably a larger screen than basic mobile devices so it can be read with ease by most peoples. In an exemplary embodiment of this implementation, a multinational company manager sends an email to a plurality of company owned anchor devices around the country or the world to alert all employees located at the related facilities about an emergency situation. Another embodiment of the anchor device type is a system of city beach alert devices that can be placed along a beach promenade (illustrated by references 100 in FIG. 4 and FIG. 5); each of these devices displays a virtual poster (illustrated by FIG. 6) to incite all beach visitors to use the system of the invention in order to get safety alert in real time while staying on the beach; any beach visitor equipped with a compliant device of the system can subscribe to this city beach alert system (illustrated by FIG. 7 and FIG. 8). Another embodiment of the anchor device type is an electronic location oriented poster panel for commercial or non commercial purpose (illustrated by FIG. 7), that can be placed on a stand, hung on a wall inside a building or on the street; and can be used to replace its paper poster panel counterpart.

A concept of virtual coupons being broadcast via virtual service channel and virtual poster, as a means to allow a location based service provider or merchandise retail store to distribute price discount rewards to nearby potential customers as an incentive to come to his business premises to get a service or buy goods for a discounted price. The said business can use an anchor device of the system to create and activate a virtual service channel with at least one virtual poster containing actionable virtual coupons; he then must put up his anchor device near his business premises, and can also create duplicates of this anchor device to expand the marketing spatial coverage if needed. As a result, when a person enters the network coverage of the business' anchor devices, he can see the discount coupon presented via the format of a virtual poster displayed on the screen of the anchor devices (illustrated by FIG. 7), but he can also see it on the screen of his mobile device if, on the latter, the method implemented program of the system is activated; this person can then select and save these virtual coupons on his device (illustrated by reference 101 in FIG. 7 and reference 103 in FIG. 9). The virtual coupon is stored by the method of the system in form of a preformatted message which contains the virtual coupon's secret code that only the said business can recognize and accept. At the business premises, this person can send any saved virtual coupon on his device to the business' dedicated anchor device which will then accept it via the same virtual service channel and the same virtual poster to redeem the related coupon. The location based service provider or merchandise retail store has the ability to adjust or deactivate, when needed, the advertising of the said price reduction coupons in real time by simply deactivating or deleting the coupon associated virtual posters. An embodiment of the concept of virtual coupons of the invention is to create a real-time virtual coupon based marketing system for a seafood restaurant (illustrated by FIGS. 7, 9); a visitor who is interested by the restaurant offer after seeing a virtual coupon alert icon and the full display of the related virtual coupons on the screen of these anchor devices, can save the said virtual coupon on his mobile device.

A mobile device implemented method to turn a device of the system into a relaying device in order to expand the network connection coverage range of an originating device of the system (illustrated by reference 120 in FIG. 14 and reference 223 in FIG. 25). A relaying request message received by a relaying device will be automatically resent to a predefined list of destination relaying devices; as a result an inter-device message can be transmitted as far as the relaying devices are repeated. A relaying request message contains two elements: an original message and a relaying request for this original message; this original message is a message sent from a device that may be far away from the receiving relaying device but needs to be passed on to all nearby devices of the latter and beyond. The list of destination relaying devices of a relaying device can be defined via a manual setup on the relaying device itself or via a predefined message sent from an administrating relaying device. Any relaying device partaking in a mesh of relaying devices must subscribe to a same virtual service channel and associated virtual user group code dedicated to the relaying purpose, so that the relaying request messages are separated from other messages of the system. A relaying device has by design a dual role: firstly repeat the broadcasting of each relaying request to all its peers of the relaying network; and secondly extract and broadcast the content of the original message embedded in each relaying request message, under another virtual service channel defined by the embedded original message so that the nearby devices of the said relaying device can receive. If a mesh of relaying devices becomes too big, as a result of large network spatial coverage, the said mesh can be sub-divided into many sub-meshes which will have each an entry-exit end point equipped with broadband connection capability, so that relaying request message transmissions can hop across a great distance between sub-meshes.

A mobile device implemented method that manages all broadcast messages of the system through a standardized format which must include at least the virtual service channel identification string, virtual user group code, originator device identification.

A mobile device implemented method to make a device of the system to become an access monitoring device of targets such as people, machines, vehicles or any moving objects. Each said authorized target must be equipped with a device of the system and subscribe to a predefined virtual service channel and a plurality of predefined virtual user groups dedicated to the purpose. Each said access monitoring device can discover authorized and unauthorized entrance at each entry point of a facility where the said device is placed and activated; the said access monitoring device can also detect exiting targets at each exit point of the said facility then update the count of targets that still remain inside the facility. Each access monitoring device broadcasts, periodically on a predefined interval basis, a self identification request message through the same predefined virtual service channel and predefined virtual user groups dedicated to the purpose. Upon a motion detection at monitored entry or exit point, an access monitoring device triggers a predefined timer during which the entering or exiting device must response to the said self identification request message. If the entering or exiting device remains silent when the timer duration expires, the access monitoring device will activate a sound alarm or send an alarm short message to its previously set up list of report receiving devices. If the entering or exiting device responds via the said virtual service channel before the timer duration expires, then the method implemented program of the access monitoring device will check if the virtual user group identification code embedded in the response message of the entering or exiting device is recognized as an authorized code; if the authorization check fails then the subsequent action may be similar to the case of non response from the entering or exiting device. If the authorization check succeeds then the access monitoring device can store into its non transitory readable medium the identity and the updated count of remaining targets, and also can send this information to a dedicated anchor device of the system if needed. An exemplary embodiment of this method is to turn a system of mobile devices into an automated counting system of restricted visitors, guests or vehicles for a special event organized at a large facility: the facility administrator can obtain at any time one accurate count of visitors, guests or vehicles that enter the facility, and an another accurate count of visitors, guests or cars that leave the facility, so that he can keep the flow of visitors at a manageable level.

A concept of nearby service directory channel which is a virtual service channel specially dedicated to broadcasting a directory of virtual service channels related to services or businesses that are available in the proximity of the location where these services or businesses want to be advertised. The device of the system that broadcasts the nearby service directory channel will send to all nearby devices whenever the latter become reachable, a tailored message that contains the profiles of the virtual service channels that represent the said nearby services or businesses (illustrated by FIG. 7). As a result, after extracting the content of the said tailored message, the nearby user's device will show, for each item of the nearby service list, the profile of the item's associated virtual service channel: a local language based title and if needed, an unique identification string, a virtual user group code; on his device, the user then can select any item of the displayed list in order to get the detailed information about the selected service item. The device of the system that broadcasts the nearby service directory channel can be used conversely and concurrently as a receiving device in order to get the same information so that nearby users who are not equipped with a device of the system can still get informed through the same process. Embodiment of this concept can be as follows: Inside a large festivity facility where a number of anchor devices are set up at different points, a festivity goer can discover services or activities that are offered around, and the related service offering information will change as he moves around in the facility; one of the nearby services can be dedicated to emergency service information so that all festivity participants can be informed quickly, should a danger arises. Another embodiment of this concept is a camping site that is equipped with a plurality of anchor devices, set up at different points of the site, to inform campers what services the camping site offers at each point close to where the campers are, and alert them about imminent dangers when needed.

A mobile device implemented method to make a device of the system to become a waiting list registration device that can be used by customers to register to be serviced in a business or public facility in the order of their arrival. The said waiting list registration device makes use of the concept of special virtual service channel to carry all active registrations of a targeted waiting list. The administrator of this facility can set up a waiting list registration device then put it on a mobile stand at the entrance hall of his facility to invite the visiting customers to use the system. The administrator sets up this waiting list registration device by defining and activating a virtual service channel and its associated virtual user group code, then creating a virtual poster that contains the real-time content of the service targeted waiting list (e.g. currently served waiting number and available registration number for next arrived customers); as a result the said virtual poster will be automatically broadcast over the air and displayed on this waiting list registration device. A plurality of message relaying devices can be used to expand the coverage of the waiting area, so that the customers can get out of a crowded waiting room but still get informed about their waiting status. A customer who comes in the entrance hall of a business facility can see a said waiting list registration device with, on its screen, a text inviting him to download the proposed application on his mobile device then activate the said virtual service channel with associated virtual user group code; the said customer will then see a virtual poster displayed on his device that shows the current status of the waiting list (e.g. currently served waiting number, available registration number for next arrived customers) along with a virtual registration button; the customer can tap on this registration button in order to trigger a registration message to be sent to the registration device to complete his registration process; the customer's device will receive then its waiting identification number from a confirmation message sent by the waiting list registration device. The waiting list registration device will send regularly waiting progress update messages to all nearby registered devices (of their registered customers), so that the registered customers can estimate how much time they must wait until they can be serviced. Any registered customer can also, from his registered device or from the registration device of the facility, cancel his registration from the waiting list by sending a predefined deregistration message that contains the identification number of the registered device via the same predefined virtual service channel with assigned virtual user group code. An embodiment of the said waiting list registration device is a waiting list registration for a customer service of a public car registration office, or a waiting list registration for customers to be seated in a big restaurant.

A mobile device implemented method to make an anchor device of the system to become a media-information display-broadcast device which has a real-time dual role: showing on its screen a media enriched information about an object of interest placed next to it, and in the same time broadcasting over the air a short non-media information about this object of interest; the purpose of a media-information display-broadcast device is to allow a user watching an object of interest to get informed about it by reading a full media enriched information displayed on the screen of a media-information display-broadcast device placed next to the said object of interest, then to collect this information electronically via a device of the system (illustrated by FIGS. 26, 27, 28). The invented media-information display-broadcast device is made possible by implementing an invented concept of virtual poster dual which consists of two virtual posters paired with each other by content (e.g. predefined content title or identifier): the first paired virtual poster is defined for displaying on the screen of the media-information display-broadcast device, but not for broadcasting; the second paired virtual poster is defined for broadcasting but not for display; the first paired virtual poster can comprise displayable media files (e.g. images, photos, video clips, audio files), text files destined to be shown on the media display-broadcast device's screen, so that a viewer of an object of interest can have a best possible information about the object; the second paired virtual poster can comprise simple text message, code of previously stored media item or hyperlink, so that the said second paired virtual poster can be broadcast as short message using the network connection module of the system; even though the broadcast information is usually very much shorter than the displayed one in case of previously stored media item or hyperlink, however the user may not see much the difference since the user's receiving device of the message of the second paired virtual poster can restore the original content of the said previously stored media item or hyperlink. Media-information display-broadcast devices can be used to create a dynamic and real-time theme presentation guided tour inside a facility (e.g. painting gallery, museum) or an open space (e.g. theme park, garden): based on a theme content, the objects of presentation are placed throughout the said facility or area will have next to each of them an associated media-information display-broadcast device in order to provide information accordingly; the resulting mesh of these media-information display-broadcast devices can also be organized, scheduled, synchronized and updated either manually or remotely (over the air by means of the network connection module of the system) by one or many assigned media-information display controlling devices; the controlling of the said mesh of media-information display-broadcast devices can be set up via one or many predefined virtual service channels and one or many associated virtual user groups, depending on the complexity of the underlying theme.

A mobile device implemented method to allow a user to use a device of the system to engage in a chat session with other peers via their own devices by setting up a virtual service channel and associated virtual user group for this purpose; a said chat session can be triggered and managed by broadcasting interactive virtual posters and handling the reception thereof.

The following embodiment samples are not meant to limit the scope of the present invention, but are destined to show how the invention can be implemented in some real life use cases:

One embodiment of the system of the invention relates to a building real-time inter-resident communication system in which each basic device or anchor device becomes a real estate internal communication device that carries messages through a dedicated virtual service channel with multiple virtual user group codes to inform manually (by people) or automatically (by devices) the residents of the building about anything that is relevant to their building, the residents thereof or to allow these residents to communicate with each other. The system consists of setting up a system administrator dedicated device in the building hall, a mobile device dedicated to mail-package delivery monitoring and placed above the mailbox cluster unit; on each floor of the building one message relaying device, and one device (hung on door) per each apartment/office on each floor. Some or all of these devices can be equipped with embedded sensors. The residents of the building who also want to get informed wherever they go inside the building can use their own mobile device or wearable device as part of the said system. All devices of the said system must have the application program of the system installed on them. Once the system is activated, the building manager, the postal carrier, or any authorized resident can use the system to send messages or task requests to every occupant of the apartments or offices of the building; or to trigger sound or voice alarm on some or all devices of the system. The messages can be about mail or package arrival, parking occupancy issue, building maintenance, neighborhood events, etc. The task requests can comprise automated emergency or help phone calls, sound or voice alarm activation. Installation of additional relaying devices in a same floor may be needed to assure full coverage of that floor. Each said mobile device can be upgraded to function as anchor device if more functionalities are needed. Some or all devices of the system can be programmed to send automated messages to report relevant information, states and statuses of the devices themselves or the embedded sensors of the devices; the automated message sending can be triggered by programmable events that are generated either by the device embedded timers or by the device embedded sensors.

Another embodiment of the system of the invention relates to a media information display-broadcasting system in which the media information display-broadcasting devices that are placed, by means of mobile stands throughout a public event gathering such as concert, street fair, holiday celebration, beaches, etc. As a visitor comes by any of these mobile stands, will notice an invitation on the screen of the stand to download the proposed application on his mobile device in order to turn his device into a device of the system then get informed in real time in case of emergency or in case of update of on-the-spot scheduled events (illustrated by FIGS. 4, 5, 6, 7, 8). The visitor then follows the mobile application instruction via a couple of screen taps to activate the dedicated virtual service channel for the purpose. After this point, in the event of any emergency or looming danger, the organizer of the place can edit a virtual poster then broadcast it; as a result the visitor will be alerted immediately via poster based messages that pop up on his device and optionally via a sound alarm whenever he is inside or enters the network connection range of a nearby virtual media information display-broadcasting device or a nearby message relaying device. In other situations, the user can browse on his device of the system, a proposed slideshow of services (restaurants, shops, movie theaters, etc) that are present in the proximity; the said displayed information is obtained from the virtual poster broadcasting made by one of the nearby virtual media information display-broadcasting devices.

Another embodiment of the system of the invention relates to a remote emergency help request activation system through which a person in an emergency situation can send a task request from his wearable device or beacon device to a previously associated anchor device, placed somewhere inside his residence and within the network connection range of the system, so that this predefined associated anchor device can in turn automatically perform the requested task (illustrated by FIGS. 18, 19). The emergency help request can be a phone call to a public emergency service, a phone call for help to a co-resident or a person living nearby, or simply an audio playing request of predefined emergency alarm sound or voice message on a predefined list of devices of targeted co-residents who can provide help; each alarm sound or voice message can be accompanied with a text message if needed. The remote emergency help request activation system can be useful for a person who finds himself alone in a health emergency situation but is unable to reach his mobile phone in order to perform the phone call to get help; this person can wear a beacon device of the system on his neck at all time, or a wearable device of the said system on his wrist. In this health emergency situation, this person can press on the beacon device's pushbutton or on the wearable device's screen to send an emergency help request message to his predefined associated anchor device; as a result the predefined associated anchor device can pick up the broadcast message then perform an automated public or private emergency phone call or send a message of audio alert activation request to the targeted co-residents' devices, so that these targeted devices will play a predefined emergency alarm sound or a predefined voice message, and additionally will display an associated text message if needed.

Another embodiment of the system of the invention relates to an indoor short message communication system through which members of a house, an apartment or an office can send quickly to each other short text messages or pre-stored media item embedded messages (illustrated by FIGS. 14, 15, 16, 17); the pre-stored media items are items that can be system initially provided items or user previously stored items; the pre-stored media items can be texts, sounds, voice messages, photos, video clips, audio clips; the advantage of pre-stored media items is to allow users to send most commonly used messages quickly and also to provide media enriched content to messages while using the inherently limited communication capacity of the underlying network connection of the system. For instance a mother can send a preprogrammed text or voice message "Lunch ready" to her children in her house all at once; her children will be alerted by their smartphones or wearable devices which receive the message then load the related pre-stored text or media item then show it on the screen or play it using the device equipped audio component. For the purpose of user convenience and reduction of power consumption use, the said system can provide pre-stored text message, voice message, alarm sounds, photos or video files. For short text messages, the user can make his own text message. For making, storing and dispatching customized voice messages, photos and sounds, the sending and receiving devices of the system need to be equipped with relevant hardware components and additional high payload network connection capacity.

Another embodiment of the system of the invention relates to a mobile poster slideshow display stand system inside a public or commercial facility in order to provide real time information display to visitors inside a facility and allow them to quickly collect this information on their devices if needed. The system can have one or many mobile poster slideshow stands depending on the purpose need. Each mobile poster slideshow stand of the said system is an anchor device placed on a mobile stand. The information is displayed on the screen of each anchor device as a slideshow and is originated from the virtual posters activated from the related anchor device via a predefined virtual service channel and associated virtual user group code. The displayed information can include sounds, images, video clips, audio clips and hyperlinks. The displayed information content of each mobile poster slideshow stand can be managed remotely by a designated anchor device of the said system. A visitor, once enters the facility can receive, on his mobile device of the system after subscribing to the said virtual service channel and associated virtual user group, messages from the nearby mobile poster slideshow display stand of this location, which present nearby services or businesses. The user's device can use the device's own broadband connection or WiFi to open hyperlinks from these messages. For example, a restaurant owner can set up and place at the entrance of his restaurant a mobile poster slideshow display stand to show and present the menu du jour and other culinary specialties that the restaurant offers; as a result the customers who enter the restaurant will see immediately the mobile poster slideshow display stand and then can read the displayed information while waiting to be seated.

Another embodiment of the system of the invention relates to a virtual device searching system through which each mobile device of the system functions as a message relaying device to locate a lost device or a missing person that carries the searched device. On receiving a device search message, any device of the system that is not itself the searched device will relay the search message to other devices; also when a device receives a message that contains the information about the location of the found device, will send back this message to the last originating device from which the transit device receives the search message.

Another embodiment of the system of the invention relates to an ad hoc virtual media source exchange system through which a group of users can set up to allow its members to obtain from media source owners inside the group, quick access to their respective media servers or cloud servers in order to download media files (picture, audio, video, text) that have just been made and uploaded by these media source owners at a public gathering. For example, a member of a group of guests at a wedding ceremony who just creates a number of media sources (e.g. pictures, video clips, sound clips) then uploads them to his cloud server or website server; once the uploading is done, this media source owner, on his device, creates and activates an ad hoc virtual service channel associated with a virtual group user code of his choice for the media source exchange purpose, he then creates and activates a virtual poster that contains the hyperlink of his cloud or website server; finally this media source owner invites other nearby guests of the wedding ceremony to subscribe to the same virtual service channel and associated virtual user group code; as a result, the devices of these nearby guests of the wedding ceremony will automatically receive the said virtual poster from the media source owner's device; these guests then will see this virtual poster displayed on their device screen and can select the included hyperlink of the related server in order to download the shared media files that were made by the media source owner.

BRIEF DESCRIPTION OF THE DRAWINGS

List of Figures Per Pages of Drawings
    Page 1:
FIGS. 1, 2, 3
    Page 2:
FIGS. 4, 5, 6, 7, 8, 9
    Page 3.

BRIEF DESCRIPTIONS OF FIGURES

Figure 10:
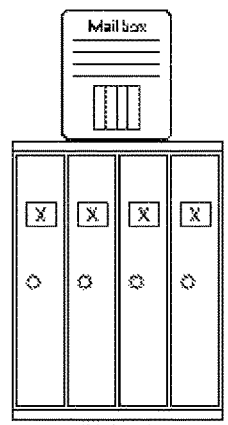
FIGS. 10, 11, 12, 13
    Page 4.
Figure 11:
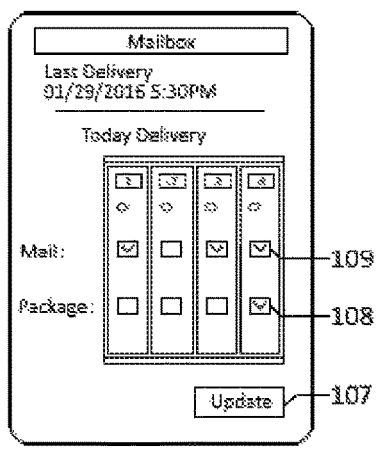
Figure 12:
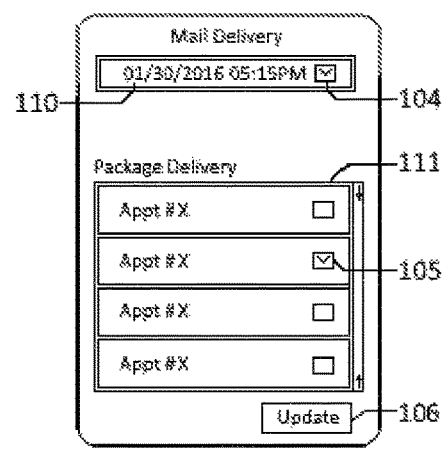
Figure 13:
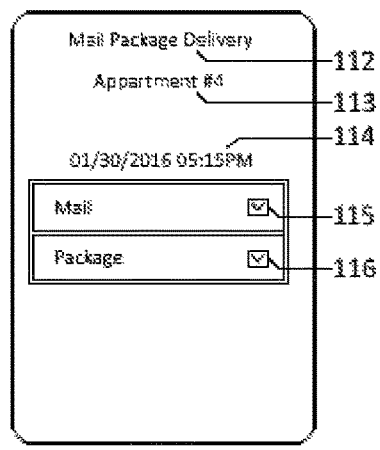

FIG. 1:
Illustrating a sample table of definitions of virtual service channels; each row of the table defines a virtual service channel using an association of:
    Virtual service channel identifier 91 (left column)
    Network generated service universally unique identifier 90 (right column)
FIG. 2:
Illustrating a sample table of definitions of virtual service bands; each row of the table defines a virtual service band using an association of:
    Virtual service band identification number 92 (left column)
    Network generated service universally unique identifier 90 (right column)
FIG. 3:
Illustrating a sample table of definitions of virtual service channels; each row of the table redefines a virtual service channel of FIG. 1 using an association of:
    Virtual service channel identifier 91 (left column)
    Virtual service band identification number 92 (right column)
FIG. 4:
Illustrating a sample city beach alert information display-broadcasting system using the system of the invention; the said system is composed of three anchor devices mounted on mobile stands 100, 101, 102 and placed along a beach promenade at a equal distance (i.e. 100 meters), so that the said system's network coverage continues between these anchor devices.

FIG. 5:

Illustrating an anchor device of the city beach alert information display-broadcasting system 100 put on a mobile stand at a beach promenade, and a beach visitor approaches it and prepares to select and activate the said city beach alert information display-broadcasting system on his mobile device of the system of the invention.

FIG. 6:

Illustrating the content of a sample virtual poster shown on the screen of an anchor device 100 (set up on a mobile stand) that beach visitors can see when approaching it; in this example, the displayed virtual poster invites beach visitors to install the program of the system of the invention on their smartphone or wearable device if it is the first time they use the system of the invention, so they can select, subscribe and activate a virtual service channel named as "City Beach Alert" on their device then get informed in real time about beach safety alerts or nearby events.

FIG. 7:

Illustrating a selectable drop-down menu of available nearby services displayed via the sample "Nearby Services" virtual poster shown on the screen of a beach visitor's mobile device after he installs the program of the system of the invention on his mobile device; the sample "Nearby Services" menu can also be triggered via other menu option of the program of the invention if this is not the first use of the system of the invention; the displayed list of available nearby services comes from the content of a "nearby service directory" dedicated virtual service channel that each anchor device 100 owns and broadcasts; the said beach visitor can then select one of the options of the drop-down menu to subscribe, activate and get informed about the associated service of the selected option; the beach visitor in this example will select the "City Beach Alert" option. Titles of some commercial virtual service channels inside this displayed list of available nearby services are accompanied with a virtual coupon icon 101.

FIG. 8:

Illustrating the content of the sample virtual poster of the "City Beach Alert" virtual service channel, shown on the screen of the mobile device of a beach visitor after the latter selects "City Beach Alert" option from the sample "Nearby Services" menu of FIG. 7; in this sample virtual poster, the beach visitor is invited to select the button "Activate & Subscribe City Beach Alert" in order to have the installed program of the system of the invention to automatically create a virtual service channel named as "City Beach Alert"; this virtual service channel is attached to the virtual service band #1 of the system of the invention, and owns a virtual user group under the code "2016" as presented on the said virtual poster.

FIG. 9:

Illustrating the content of the sample virtual poster of the "Seafood Restaurant" virtual service channel, shown on the screen of the mobile device of a beach visitor after the latter selects "Seafood Restaurant" option from the sample "Nearby Services" menu of FIG. 7; in this sample virtual poster, the beach visitor is invited to select the button 103 ("Coupon . . . ") to save a virtual coupon into the non-transitory readable medium of his mobile device so the virtual coupon can be redeemed later on, for price reduction reward, when the beach visitor arrives at the business facility that owns and broadcasts the "Seafood Restaurant" virtual service channel.

FIG. 10:

Illustrating a mail delivery alert device using the system of the invention that is hung above a residence mailbox. The screen of the mailbox alert device shows the date and time of the last mail delivery made by the last visiting postal carrier using this mail delivery alert device.

FIG. 11:

Illustrating a sample interactive virtual poster displayed on the screen of a mail-package delivery alert device of the system of the invention dedicated to a residence building that has a small number of residents (a big residence will need a different user interface since the number of residents is much higher); this sample virtual poster shows a sample menu that a postal carrier can use to update his mail-package delivery. In this example, because the number of residents is small, the postal carrier can inform the residents of the building individually for each mail delivery and each package delivery via selection of checkboxes shown inside a mailbox drawing that represents the actual mailbox object:

For Mail delivery update: The postal carrier just needs to select the checkbox 109 associated to the mail delivery presence for a specific resident that receives a mail.

For Package delivery update: The postal carrier just needs to select the checkbox 108 associated to the package delivery presence for a specific resident that receives a package.

Finally the postal carrier can select the "Update" button 107 to trigger a chain of alert messages that the mail delivery alert device will send to the residents who have subscribed to receive these alerts via a mail delivery dedicated virtual service channel with associated virtual user group using their device of the system of the invention.

FIG. 12:

Illustrating a sample interactive virtual poster displayed on the screen of a mail-package delivery alert device of the system of the invention dedicated to a residence building that has a large number of residents; this sample virtual poster shows a sample menu that a postal carrier can use to update his mail-package delivery. In this example, because the number of residents is large, the postal carrier cannot inform the residents of the building individually for each mail delivery, but can provide only the general mail delivery date and time; however as the number of delivered packages is usually small, the postal carrier can inform the residents individually for package delivery. The mail-package information update process is as follows:

For Mail delivery update: The shown mail delivery date and time 110 is provided by the method of the invention with the current date and time, the postal carrier just needs to select the associated checkbox 104 to confirm that there is a mail delivery at that date and time; this checkbox is a displayed item of the preformatted responses of the dedicated virtual poster.

For Package delivery update: The postal carrier just needs to scroll through the list of residents of the building 111 then select the checkbox 105 associated to each apartment that receives a package; these checkboxes are displayed items of the preformatted responses of the dedicated virtual poster.

Finally the postal carrier can select the "Update" button 106 to trigger a chain of alert messages that the mail-package delivery alert device will send to the residents who have subscribed to receive these alerts via a mail delivery dedicated virtual service channel with associated virtual user group using their device of the system of the invention.

FIG. 13:

Illustrating a sample of tailored mail-package delivery alert message sent from a mail-package delivery alert device (place above a residence building mailbox) to a building resident who has just received a mail and/or a package whenever the resident enters, by means of his device, the network coverage defined by the system of the invention.

The sample information items displayed in the message are:

- The title of the tailored mail-package delivery message 112
- The identification of the mail-package receiver 113
- The mail-package delivery date and time 114
- The mail delivery presence indication via the checkbox 115
- The package delivery presence indication via the checkbox 116

FIG. 14:

Illustrating a home of two floors in which all living members communicate with each other via a sample of a real estate internal communication system using the system of the invention: In this example, a living member prepares a dinner then uses the program of the system of the invention stored in his/her mobile device 123 of the system of the invention to send a pre-stored voice message "Dinner" to all remaining members of the house announcing that the dinner is ready; consequently the mobile device 123 will send this pre-stored voice message to the mobile device 122 left on the wall shelf of the room #3; a family member laying on bed inside this room will hear a voice message coming out of the mobile device 122; in the room #2 a wearable device 121 left on a table receives also the same voice message from the device 123; two message relaying devices 120 of the system of the invention are hung on the wall of the staircases to expand the network connection coverage to all the rooms of the second floor (in case of very big house).

Figure 14:
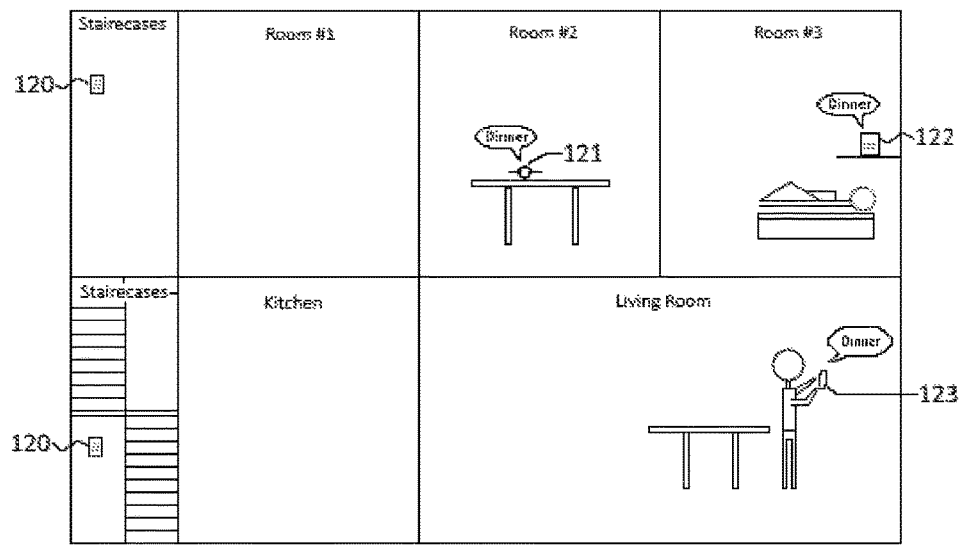
FIGS. 14, 15, 16, 17
    Page 5.

FIG. 15:

Illustrating a sample menu displayed on the screen of a device of a real estate internal communication system using the system of the invention that a message sender described in the FIG. 14 can use to select targets among all remaining members of the house that will receive the message, and to select the type of message the targets will see and/or hear; these two selections are part of the first step of the process of the invention to send a message from one device to other peer devices inside a house equipped with a real estate internal communication system using the system of the invention. The said menu contains:

- A local language based title of the virtual service channel "Home Residents" 124 (which can be identified with a standard identifier string of the system of the invention e.g. "home") that all members of the house share for broadcasting and subscribing to communicate with each other inside the house.
- A drop-down list menu 125 containing names of all other members of the house that can be selected as receivers of the intended message.
- Each item in the drop-down list of names 125 can be selected or deselected by a checkbox 126.
- A action title "Send" 127 with a list of send options 128: sound alarm, typed message, pre-stored message (text or voice).
- A send option "pre-stored message" 129 is the chosen option of the message sender in this example.

FIG. 16

Figure 15:
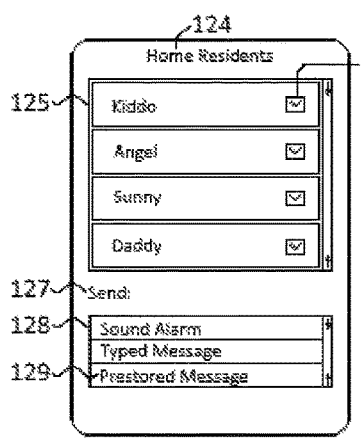
Figure 16:
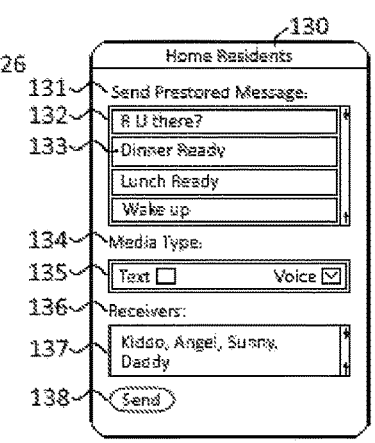
Figure 17:
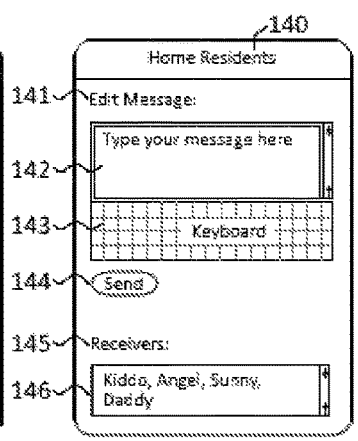

Illustrating a sample menu displayed on the screen of a device of a real estate internal communication system using the system of the invention that a message sender (described in the FIG. 14) can use to select a pre-stored message and its media type in order to finally trigger the sending of the related message to the previously chosen message receivers (described in the FIG. 15). The said menu contains:

- A local language based title 130 of the virtual service channel (same as 124 in FIG. 15) that all members of the house share for broadcasting and subscribing in order to communicate with each other inside the house.
- A local language based title 131 of the specific sending action obtained from the previous action of the message sender in FIG. 15.
- A drop-down list 132 of pre-stored messages that are extracted from the non-transitory readable medium of the mobile device (of the system of the invention) of the message sender; the message sender can scroll through this drop-down list to select one item among them.
- A pre-stored message "Dinner ready" 133 that has been selected by the message sender in this example.
- A local language based option title 134 of media type of the pre-stored message to be sent.
- Two checkboxes 135 of media types of pre-stored message to be selected by the message sender: text or voice.
- A local language based option title 136 of the list of previously chosen message receivers.
- A displayed list 137 of previously chosen message receivers (described in the FIG. 15) that the message sender can verify for the last time before triggering the sending.
- A "Send" button 138 that the message sender can select to trigger the sending of the prepared message.

FIG. 17

Illustrating a sample menu displayed on the screen of a device of a real estate internal communication system using the system of the invention that a message sender (described in the FIG. 14) can use to edit a text message then send it to the previously chosen message receivers (described in the FIG. 15). The said menu contains:

- A local language based title 140 of the virtual service channel (same as 124 in FIG. 15) that all members of the house share for broadcasting and subscribing in order to communicate with each other inside the house.
- A local language based title 141 of the specific action to do (editing message) for this step based on the previously selected message type in FIG. 15.
- An user input editor field 142 that the message sender can use to edit the message using the keyboard 143.
- A "Send" button 144 that the message sender can select to trigger the sending of the edited message.
- A local language based option title 145 of the list of previously chosen message receivers.
- A displayed list 146 of previously chosen message receivers (described in the FIG. 15) that the message sender can verify for the last time before triggering the message sending.

FIG. 18:

Illustrating a home where lives an elderly resident who lives alone and uses devices of the system of the invention in an emergency situation: an elderly resident 150 falls in the shower room uses a smartwatch 151 or a push-button based alert pendant 152 to send a task request message for an emergency call to a smartphone 154, left on the shelf of the bedroom, which will then automatically perform a phone call to a public emergency service 153 based on a previously setup for this emergency call; a finger press on a push-button based alert pendant 152 or a predefined finger touch on the screen of a smartwatch are sufficient to trigger the sending of an emergency request message.

Figure 18:
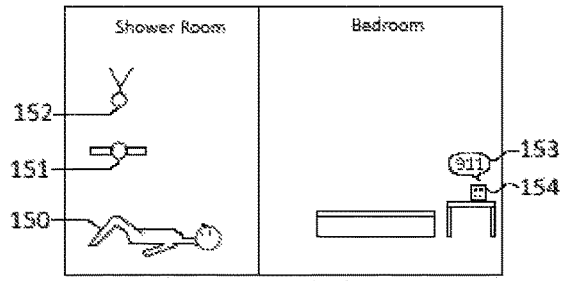
FIGS. 18, 19, 20, 21, 22, 23, 24
    Page 6.
Figure 19:
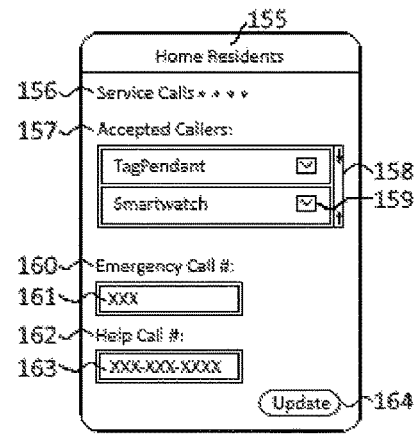

FIG. 19:

Illustrating a sample menu displayed on the screen of a mobile phone of the system of the invention that an elderly resident (described in FIG. 18) can use to set up all service calls for emergency cases. A sample service call profile of the system of the invention contains an automatic emergency call setup and an automatic help request call setup that will be used by this mobile phone when a service call request message is received from a designated push-button based alert pendant, a smartwatch or a wearable device that this resident wears at all time for the emergency purpose. The said sample menu contains:

- A local language based title 155 of the virtual service channel chosen for emergency purposes by the resident of this example.
- A local language based title 156 of the profile of service calls for this virtual service channel.
- A drop-down menu 158 containing two identifiers of the service request initiating devices (a push-button based alert pendant and a smartwatch) that this resident can define as authorized devices to make these service call requests; these identifiers are obtained from the broadcasting emanated from these designated devices, and will be used to verify the call requester when an emergency or help call request message is received; the drop-down menu is labeled with a local language based title 157.
- Authorization of a service request initiating device inside the drop-down menu 158 can be made via selection of checkbox 159.
- An user input editor field 161 that this resident can use to enter or update a phone number that will be called for an emergency situation; this phone number can belong to a public emergency service or a private person of choice or a private service of choice; the editor field is labeled by a local language based title 160.
- An user input editor field 163 that this resident can can use to enter or update a phone number that will be called for an ordinary help request situation; this phone number can belong to a private person or service of choice; the editor field is labeled by a local language based title 162.
- An "Update" button 164 that this resident can use to save the setup of the edited service call profile into the device's non-transitory readable medium for use when needed.

FIG. 20:

Illustrating a sample anti-theft system using the system of the invention: this sample anti-theft system comprises three devices of the system of the invention that a resident in a house uses as that monitors his/her car and motorcycle that are parked outside the house but are still within the system inherent network coverage. A monitored mobile device 170 is attached to the driver seat of the monitored car. A monitored beacon device 171 is attached to the monitored motorcycle's neck. These said devices after being activated via a virtual service channel and associated virtual user group for the purpose, send regularly short messages, reporting their motion and presence statuses to a monitoring smartphone 172 placed on a wall shelf inside the house; the monitoring smartphone 172 will trigger a sound alarm whenever the car's monitored device 170 or the motorcycle's monitored beacon device 171 does not respond after each period of time defined by a predefined timer expires, or whenever either of them reports an unexpected motion.

Figure 20:
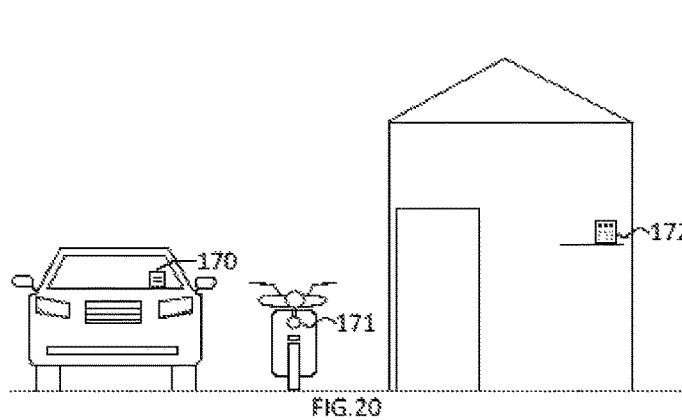
Figure 21:
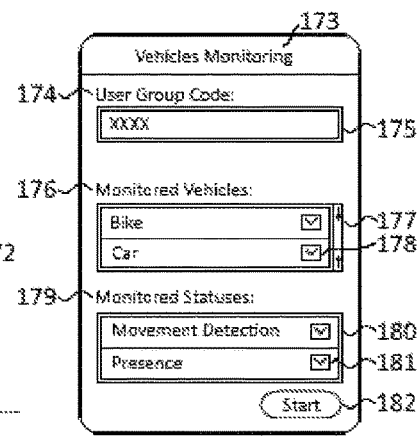
Figure 22:
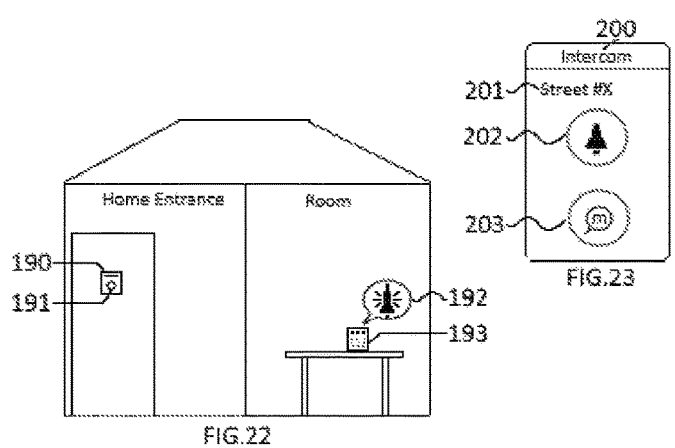
Figure 23:
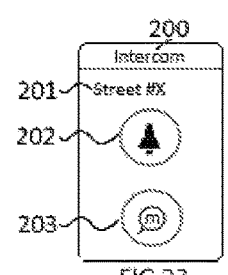
Figure 24:
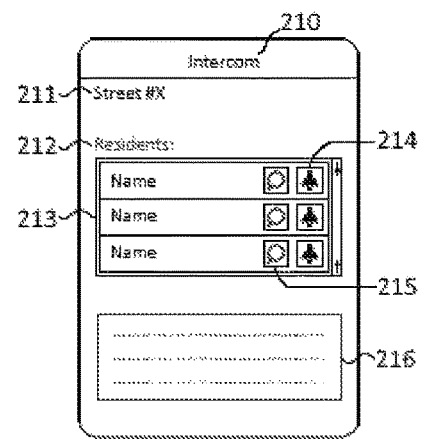
Figure 25:
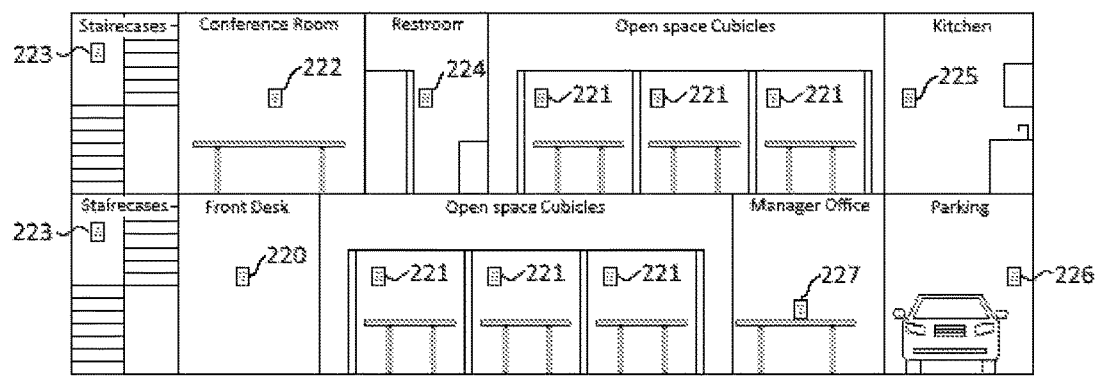
FIG. 25, 26, 27, 28

FIG. 21:

Illustrating a sample menu displayed on the screen of a mobile phone of the system of the invention that a resident in the house (described in FIG. 20) can use to set up the monitoring of his car and his motorcycle via a system predefined virtual service channel "Vehicles monitoring" with the resident's predefined user group code from his smartphone 172 (described in FIG. 20) placed on a wall shelf when not used. The said sample menu contains:

- A local language based title 173 of the standard virtual service channel for vehicle monitoring purpose used by the resident of this example.
- An user input editor field 175 that this resident can use to enter or update the user group code associated to the resident's virtual service channel for vehicle monitoring (to differentiate from same virtual service channel of his neighbors); the user input editor field is labeled with a local language based title 174.
- A drop-down menu 177 containing the identifiers of two vehicles that can be monitored; both the car and the motorcycle are present and their monitoring options are selected via checkbox 178; these identifiers are obtained from the broadcasting emanated from the monitored devices 170 and 171 that are placed inside or attached to the monitored vehicles for the purpose; these identifiers will be verified whenever a status message of presence or movement detection is received in order to make sure that the status message is authentic; the drop-down menu is labeled with a local language based title 176.
- A drop-down menu 180 containing the types of statuses to be monitored: presence and movement detection; either all or one of them can be selected via checkboxes 181; the drop-down menu is labeled with a local language based title 179.
- An "Start" button 182 that this resident can use to activate the vehicles monitoring; the equivalent "Stop" button will trigger the deactivation thereof.

FIG. 22:

Illustrating a house equipped with an intercom-doorbell device using the system of the invention: the screen of the intercom-doorbell device 190 displays a sample menu that contains the name of the resident and a doorbell icon 191, so that the visitor or guest can understand the function of the device. When the guest presses on the doorbell icon 191, the intercom-doorbell device 190 will send a predefined sound alarm activation request message to a mobile device 193 of a resident of the house, placed on a table of the room in this example. The mobile device 193 receives the sound alarm activation request message, recognizes the sender via the predefined standard virtual service channel and associated virtual user group for the intercom-doorbell purpose, then triggers an alarm sound 192.

FIG. 23:

Illustrating a sample virtual poster displayed on the screen of an intercom-doorbell device using the system of the invention dedicated to a single house. This virtual poster shows a sample menu that a guest can use to signal his presence to the residents of the house. The sample virtual poster contains:

- A local language based title 200 that shows the function of the device.
- A sample street number 201 which is part of the address of the house.
- A touch screen based button 202 with a doorbell image or icon that a guest can touch to signal his presence.

A touch screen based button 203 with a message bubble image or icon that a guest can touch to edit and leave a message.

FIG. 24:

Illustrating a sample virtual poster displayed on the screen of an intercom-doorbell device using the system of the invention dedicated to a multiple-unit residence. This sample virtual poster shows a sample menu that a guest can use to signal his presence to residents of a unit of the residence. The sample virtual poster contains:

A local language based title 210 that shows the function of the device.

An sample street number 211 which is part of the address of the residence.

A drop-down menu 213 containing the list of residents' names of all units of the residence; each resident name of the list is associated with an icon based touch button 214 for signaling guest presence and another icon based touch button 215 for leaving a message; the drop-down menu is labeled with a local language based title 212.

A previously edited text message made by the residence administrator for the attention of all guests or visitors 216.

FIG. 25:

Illustrating an office building equipped with a system of real estate internal communication devices using the system of the invention; in this sample, the said devices are placed in different areas: 220 in front desk office, 221 in open space cubicles, 222 in conference room, 223 in staircases, 224 in restroom, 225 in kitchen, 226 in parking, 227 in manager's office; all these devices are set up for broadcasting and subscribing to a specified virtual service channel and a plurality of virtual user groups for the purpose of inter-communication between occupants inside the office building; the occupants of this office building can use any of these devices to send messages to one, some or all other devices based on virtual user group selection: e.g. 221 to alert occupants working in the open space cubicles, 222 to alert occupants working in the conference room; one device among them is assigned as a central virtual poster dispatcher device 227; the office building administrator can use the device 227 to create virtual posters that can be shown separately for each place (front desk, open space cubicles, conference room, etc) then dispatch them to their respective associated real estate internal communication devices; the office building administrator can also use the device 227 as a system administrator device for all other real estate internal communication devices in order to control them remotely.

FIG. 26:

Illustrating a gallery room inside a painting gallery equipped with a system of media-information display devices using the system of the invention; in this sample, the media-information display devices 240 is placed next to the painting 241, so that the visitors can read and get information about this painting; so is the media-information display devices 244 for the painting 245; a visitor 242 can also use his mobile device 243 to capture the information that pertains to the painting 245 via the media-information display device 244.

Figure 26:
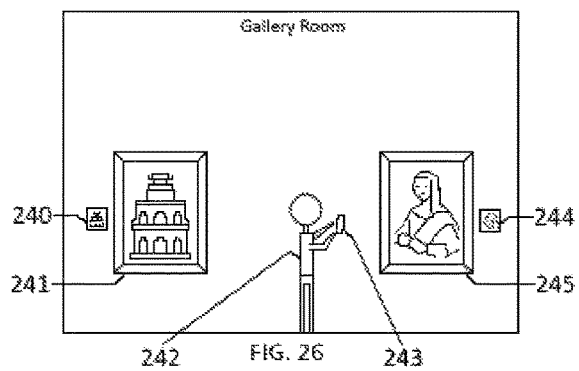

FIG. 27:

Illustrating a sample of non-broadcast virtual poster displayed on the screen of the media-information display device 244 (of FIG. 26) that the visitor 242 can see first hand the information about the painting 245 (of FIG. 26); this non-broadcast virtual poster contains a media-information title 246 and a media-information content 247 which is comprised of an image and a text to provide a descriptive information about the painting 245 (of FIG. 26); this non-broadcast virtual poster is part of a virtual poster dual created for the presentation of the painting 245 (of FIG. 26).

Figure 27:
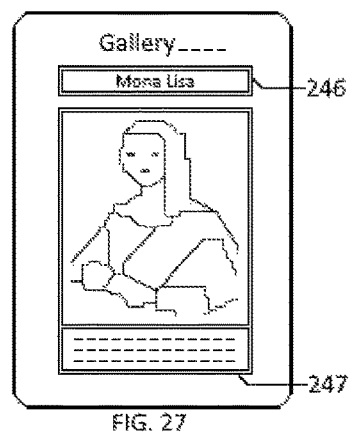
Figure 28:
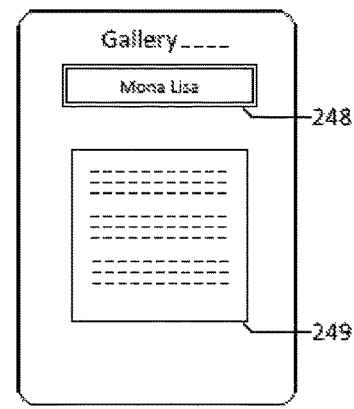

FIG. 28:

Illustrating a sample of visitor destined virtual poster that is displayed on the screen of the mobile device 243 (of FIG. 26) of the visitor 242 (of FIG. 26); this visitor destined virtual poster is received via the broadcasting from the media-information display devices 244 (of FIG. 26), after the said visitor activates the virtual service channel and associated virtual user group created for the painting gallery's media-information system of the invention; this visitor destined virtual poster is part of a virtual poster dual created for the presentation of the painting 245, and by design contains a media-information title 248 that matches the media-information title 246 of FIG. 27; as a result the visitor 242 (of FIG. 26) understands that the information he gets on his device describes the painting 245 (of FIG. 26); the media-information content 249 provides either the same or another version of descriptive information about the painting 245 (of FIG. 26); the media-information content 249 can be conveyed in full in the message of this visitor destined virtual poster or can be obtained indirectly via a hyperlink contained in the said message in order to provide more media enriched content.

What is claimed is:

1. A system for broadcasting and displaying transmitted messages comprising:

At least two or more of mobile devices connected to each other for multi-purpose targeted inter-device communications; said inter-device communications comprising:

Said at least two or more of the mobile devices establishing local or remote connections for communication, including automatic configuration of machine-to-machine interfacing and/or user-to-machine interfacing connections;

Each of said at least two or more of the mobile devices rendering display of said transmitted messages with visual presentation and/or audio presentation, wherein said transmitted messages are displayed in a preferred language based on a predetermined configuration;

Said transmitted messages are classified per a plurality of system predefined service channels accessible via provider-subscriber based peer-to-peer communication;

Said system predefined service channel serves as information exchange hub for a plurality of said system predefined user groups;

Said transmitted messages further includes at least one or more virtual posters; said at least one or more virtual posters is an information defined in time by a period of validity and made interactive by displaying items with preformatted responses for selection by viewers; wherein said at least one or more virtual posters is activated when a predefined publishing schedule time starts and deactivated when a predefined period of validity expires or when attached said system predefined service channel is deleted or deactivated; and A owning device of the said at least two or more of mobile devices of the system that owns a corresponding virtual poster sends said corresponding virtual poster's content via short message to any other devices that enter or are already present in the system defined network coverage range provided by said owning device.

2. The system of claim 1, further comprising one of the at least two or more of the mobile devices further functions as an object activity alert device placed near or inside an object of interest configured to:
  Report predefined activity events associated with the entire said object of interest or some elements thereof; each object activity report event is directed to destination peer devices on the one-to-one basis or one-to-many basis; each said object activity report event is conveyed by a message sent via said system predefined service channel and associated said system predefined user group; and
  wherein the said object activity report events are triggered by a plurality of: predefined sensor status data change event from the said object activity alert device, a predefined screen touch based action upon a particular virtual poster displayed on the screen of the said object activity alert device; the said particular virtual poster contains a plurality of clickable or touchable drawings, photos, or texts that represent the totality of the object of interest or each of the said some element thereof.

3. The system of claim 2, further comprising said anchor device of said system creating and activating a particular system predefined service channel with a plurality of virtual posters that contain actionable virtual coupons; said virtual coupons are stored and displayed on the screen of said anchor device and connectable visitor's mobile or wearable device; said virtual coupons are further stored in a preformatted message.

4. The system claim 2, further comprising said anchor device configured to:
  Pair two virtual posters of said virtual posters by content based identification by defining identical content title, name or identification code of said two virtual posters;
  Wherein the first virtual poster of said two virtual posters is defined for display but not for broadcasting, the first paired virtual poster comprises a plurality of displayable media files, text files destined to be shown display screens; and
  Wherein the second virtual poster of said two virtual posters is defined for broadcasting but not for display, the second paired virtual poster comprises a plurality of simple text message, code of previously stored media item or hyperlink for broadcasting using short message, and consequently is received and displayed on a viewer mobile device in the proximity of the said anchor device.

5. The system of claim 1, further comprising one of the at least two or more of the mobile devices further functions as an anchor device configured to:
  allow users to edit, activate and manage said virtual posters and make said virtual posters displayed on a main screen of the at least two or more of the mobile devices;
  relay said virtual posters, said transmitted messages, and media files using said system defined remote network connection;
  perform picture taking, video recording and audio recording; and
  wherein said anchor device is assigned with an email address or a hyperlink and is set up as a display stand to show said virtual posters to public.

6. The system of claim 1, further comprising some of the at least two or more mobile devices further functions as relaying devices, establishing a mesh of relaying devices, said relaying devices configured to:
  relay request messages to a predefined list of destination relaying devices expanding the network connection coverage range defined by said system; wherein one of the said relaying request messages contains an original message to be passed on to all said system connectable devices of the receiving relaying device, and a relaying request for said original message;
  extract content of the embedded original message of the request messages;
  broadcast said content using another system predefined service channel and a particular system predefined user group defined by the embedded original message;
  wherein the list of destination relaying devices of a relaying device are predefined either via a manual setup on the relaying device itself or via a predefined message sent from an administrating relaying device; and
  wherein said relaying devices are required to subscribe to a same system predefined service channel and associated system predefined user group dedicated for relaying purpose.

7. The system of claim 1, further comprising one of the at least two or more mobile devices is located and activated at a facility functioning as an access monitoring device configured to:
  Broadcast, periodically on a predefined interval basis, a self identification request message through a particular system predefined service channel and a particular system predefined user group dedicated to the purpose;
  Detect motion at monitored entry or exit point of said facility, triggering a predefined timer during which an entering or exiting device must response;
  Activate a sound alarm and/or send a report notification of unauthorized entry or unaccounted-for exit to a predefined list of report targeted devices upon absence of timely response from the entering or exiting device,
  Operate a validity check upon reception of self identification response message upon timely response from the entering or exiting device; and
  Update and store the related counting information into the access monitoring device's non-transitory readable medium, and sends said related counting information to said predefined list of report targeted devices when requested.

8. The system of claim 1, wherein the at least two or more of mobile devices is selected from smartphones, tables, smartwatches, wearable device, and/or beacon devices.

9. The system of claim 1, said system further configured to:
  Broadcast, by an anchor device of the system, only virtual directory of local business services allowing users of the system to view and obtain direct access to information related to said local business services that are available in the proximity of user location.

10. The system of claim 1, further comprising one of the two or more mobile devices functioning as a waiting list registration device configured to:
  Implement and assign a particular system predefined service channel with a user group code to carry all active registrations of a wait list;
  Broadcast, via said particular system predefined service channel, a particular virtual poster containing real-time content of a targeted wait list; the said particular virtual poster is shown on screen of said waiting list registration device for users;
  Receive at least one or more registrations to said wait list by users' devices;

Transmit a waiting identification number to the users' devices in response to receiving said at least one or more registrations;

Transmit said wait list update message regularly to registered devices of the at least one or more registrations;

Remove at least one of the registered devices from the wait list via a predefined deregistration message that contains the same said system predefined service channel, assigned user group code and the waiting identification number of the at least one of the registered device;

Wherein said users register to said wait list by subscribing to and activating, on said users' own device by selecting a response set forth in said particular virtual poster received and displayed; and wherein the user unregister to said wait list on said users' own device.

11. The system of claim 1, further comprising one of the at least two or more mobile devices functioning as a real estate internal communication device placed inside a real estate premises, configured to:

Exchange communication with other real estate internal communication devices by broadcasting via a particular system predefined service channel or a plurality of said system predefined user groups;

Remotely manage, enable or disable said other real estate internal communication device of said system;

Create and dispatch said virtual posters to said system predefined devices or group of devices using said system; and Wherein the communication including automated messages that are triggered by a plurality of said device programmable timers, user defined information report events, device states and statuses, and device embedded sensors.

* * * * *